United States Patent
Lin et al.

(10) Patent No.: US 11,778,656 B2
(45) Date of Patent: *Oct. 3, 2023

(54) BACKWARDS-COMPATIBLE NARROWBAND PHYSICAL RANDOM ACCESS CHANNEL (NPRACH) FOR EXTENDED RANGE

(71) Applicant: Telefonaktiebolaget LM Ericsson (publ), Stockholm (SE)

(72) Inventors: Xingqin Lin, San Clara, CA (US); Olof Liberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,673

(22) Filed: Sep. 20, 2022

(65) Prior Publication Data
US 2023/0013789 A1 Jan. 19, 2023

Related U.S. Application Data

(63) Continuation of application No. 17/151,463, filed on Jan. 18, 2021, now Pat. No. 11,497,051, which is a (Continued)

(51) Int. Cl.
*H04W 4/00* (2018.01)
*H04W 74/00* (2009.01)
(Continued)

(52) U.S. Cl.
CPC ......... *H04W 74/004* (2013.01); *H04L 5/0053* (2013.01); *H04L 27/2613* (2013.01); *H04W 74/0833* (2013.01)

(58) Field of Classification Search
CPC . H04W 74/004; H04W 74/0833; H04W 4/70; H04W 72/044; H04W 72/53;
(Continued)

(56) References Cited

U.S. PATENT DOCUMENTS 6,985,433 B1 1/2006 Laroia et al.
9,661,663 B1 5/2017 Lin et al.
(Continued)

FOREIGN PATENT DOCUMENTS

JP 2018537923 A 12/2018
JP 2019506792 A 3/2019
(Continued)

OTHER PUBLICATIONS

Lin, Xingqin , et al., "Random Access Preamble Design and Detection for 3GPP Narrowband IoT Systems", IEEE Wireless Communications Letters, vol. 5, Version 6, Dec. 2016, 1-4.
(Continued)

*Primary Examiner* — Phuongchau Ba Nguyen
(74) *Attorney, Agent, or Firm* — Murphy, Bilak & Homiller, PLLC

(57) ABSTRACT

An example method in a wireless device operating in a wireless network comprises generating a random access preamble signal and transmitting the random access preamble signal. The generated random access preamble signal comprises a random access symbol group that comprises a plurality of consecutive symbols, where each of the plurality of consecutive symbols being modulated on a corresponding subcarrier frequency and each of the plurality of consecutive symbols corresponding to a truncated sinusoid of 3.75/N kHz, with N>1.

18 Claims, 19 Drawing Sheets

Related U.S. Application Data continuation of application No. 16/475,504, filed as application No. PCT/SE2018/050005 on Jan. 5, 2018, now Pat. No. 10,917,912.

(60) Provisional application No. 62/442,767, filed on Jan. 5, 2017.

(51) Int. Cl.
*H04L 5/00* (2006.01)
*H04L 27/26* (2006.01)
*H04W 74/08* (2009.01)

(58) Field of Classification Search
CPC ... H04W 28/04; H04W 72/04; H04W 72/042; H04W 88/08; H04L 5/0053; H04L 27/2613; H04L 5/0012; H04L 27/2601; H04L 5/0007; Y02D 30/70; H04B 1/7143
See application file for complete search history.

(56) References Cited

U.S. PATENT DOCUMENTS

| | | | |
|---|---|---|---|
| 9,723,634 B2* | 8/2017 | Lin | H04W 72/0453 |
| 10,172,163 B2* | 1/2019 | Lin | H04W 74/0833 |
| 10,681,741 B2* | 6/2020 | Lin | H04L 27/2636 |
| 10,904,923 B2 | 1/2021 | Lin et al. | |
| 10,917,912 B2* | 2/2021 | Lin | H04W 74/004 |
| 11,109,423 B2 | 8/2021 | Su et al. | |
| 11,368,985 B2* | 6/2022 | Lin | H04L 27/26132 |
| 11,497,051 B2* | 11/2022 | Lin | H04B 1/7143 |
| 2008/0031186 A1 | 2/2008 | Onggosanusi et al. | |
| 2008/0267134 A1 | 10/2008 | Cheng et al. | |
| 2016/0192398 A1 | 6/2016 | Wang et al. | |
| 2017/0094689 A1 | 3/2017 | Lin et al. | |
| 2019/0373646 A1 | 12/2019 | Shin et al. | |
| 2020/0260502 A1 | 8/2020 | Lin et al. | |
| 2021/0144753 A1* | 5/2021 | Lin | H04W 74/004 |

FOREIGN PATENT DOCUMENTS

| | | | | |
|---|---|---|---|---|
| KR | 20090021296 A | 3/2009 | | |
| WO | 2007145660 A1 | 12/2007 | | |
| WO | 2016027125 A1 | 2/2016 | | |
| WO | 2017105693 A1 | 6/2017 | | |
| WO | 2018084953 A1 | 5/2018 | | |
| WO | WO-2018128579 A1 * | 7/2018 | ........... | H04B 1/7143 |
| WO | 2018171760 A1 | 9/2018 | | |
| WO | 2018203727 A1 | 11/2018 | | |

OTHER PUBLICATIONS

Unknown, Author, "3rd Generation Partnership Project; Technical Specification Group Radio Access Network Evolved Universal Terrestrial Radio Access (E-UTRA); Physical channels and modulation (Release 14)", 3GPP TS 36.211 V14.0.0, Sep. 2016, 1-170.
Unknown, Author, "Considerations on PRACH Design for NB-IoT", 3GPP TSG RAN WG1 NB-IoT Ad-hoc Meeting, R1-160124, Budapest, Hungary, Jan. 18-Jan. 21, 2016, 1-3.
Unknown, Author, "NB-IoT—Design Considerations for Single Tone Frequency Hopped NB-PRACH", 3GPP TSG-RAN1 NB-IOT Ad Hoc, R1-160093, Budapest, Hungary, Jan. 18-20, 1-7.
Unknown, Author, "NB-IoT-NPRACH Configurations", 3GPP TSG RAN WG1 NB-IoT Ad-Hoc Meeting, R1-161835, Sophia Antipolis, France, Mar. 22-24, 2016, 1-14.
Unknown, Author, "NB-IoT—Single Tone Frequency NB-PRACH Design", 3GPP TSG-RAN1 #84, R1-160275, St Julian's, Malta, Feb. 15-19, 2016, 1-10.
Unknown, Author, "NB-IoT-UL Design", 3GPP TSG-RAN WG1 #83, R1-157423, Anaheim, California, USA, Nov. 15-22, 2015, 1-7.
Unknown, Author, "NB-PRACH design for NB-IoT", 3GPP TSG-RAN WG1 Meeting #84, R1-160457, St. Julian's, Malta, Feb. 15-19, 2016, 1-3.

\* cited by examiner

| 1 | 2 | 3 | 4 | 5 | 6 |
|---|---|---|---|---|---|
| 2 | 4 | 6 | 8 | 10 | 12 |
| 3 | 6 | 9 | 12 | 2 | 5 |
| 4 | 8 | 12 | 3 | 7 | 11 |
| 5 | 10 | 2 | 7 | 12 | 4 |
| 6 | 12 | 5 | 11 | 4 | 10 |
| 7 | 1 | 8 | 2 | 9 | 3 |
| 8 | 3 | 11 | 6 | 1 | 9 |
| 9 | 5 | 1 | 10 | 6 | 2 |
| 10 | 7 | 4 | 1 | 11 | 8 |
| 11 | 9 | 7 | 5 | 3 | 1 |
| 12 | 11 | 10 | 9 | 8 | 7 |

*FIG. 10*

BACKWARDS-COMPATIBLE NARROWBAND PHYSICAL RANDOM ACCESS CHANNEL (NPRACH) FOR EXTENDED RANGE

TECHNICAL FIELD

The present disclosure is generally related to wireless communications networks and is more particularly related to random access procedures in an Internet of Things (IoT) supporting machine-type-communication (MTC) devices.

BACKGROUND

Members of the 3$^{rd}$ Generation Partnership Project (3GPP) are continuing to develop specifications for what is being called "NB-IoT," which refers to a "narrowband Internet of things." These standards will support wireless communications for low-power equipment that may rely on batteries and that will typically send and receive only small amounts of information. Example applications for wireless devices that support NB-IoT include providing parking meters, industrials sensors, and the like with wireless communication capabilities. NB-IoT was introduced in Release 13 of the 3GPP specifications, and is expanding the NB-Iot platform in Release 14, to provide positioning services as well as support for multicast. Release 14 of the 3GPP will also support NB-IoT devices with maximum output powers as low as 14 dBm, to allow for even lower device complexity. Incremental improvements to the Release 13 standards, such as support for system access on non-anchor carriers and improved uplink and downlink throughput are also included in the Release 14 specifications.

The radio interface for NB-IoT is designed so that the technology can readily be deployed by operators in portions of their existing Long Term Evolution (LTE) spectrum. Thus, certain aspects of NB-IoT are defined to make the most possible use of existing LTE hardware, designs, and procedures. However, changes to the LTE specifications are made at all levels of the specifications, to reduce power consumption, improve coverage, and otherwise provide for improved operation of low-power wireless equipment.

One aspect of the existing LTE specifications is random access. In LTE, as in most communication systems, a mobile terminal may need to contact the network, via the eNodeB (3GPP terminology for an LTE base station), without yet having a dedicated resource in the uplink (from user equipment, UE, to the base station). To handle this, a random access procedure is available, whereby a UE that does not have a dedicated uplink resource may transmit a signal to the base station. In the process defined by the 3GPP specifications for LTE, the first message (MSG1 or preamble) of this procedure is transmitted on a special resource reserved for random access, a physical random access channel (PRACH). This channel is limited in time and frequency, as shown in FIG. 1. The resources available for PRACH transmissions are identified to mobile terminals as part of the broadcasted system information or as part of dedicated Radio Resource Control (RRC) signaling in some cases, such as in the case of a handover.

In LTE, the random access procedure is used for a number of different reasons. Among these reasons are: initial access for UEs in the LTE_IDLE or LTE_DETACHED states; an incoming handover; resynchronization of the uplink; a scheduling request for a UE that is not allocated any other resource for contacting the base station; and positioning.

To preserve orthogonality among different UEs (e.g., cellular telephones and machine-to-machine radio devices) in an orthogonal frequency-division multiple-access (OFDMA) or single-carrier frequency-division multiple-access (SC-FDMA) system, the time of arrival of each UE signal needs to be within the cyclic prefix (CP) of the OFDM or SC-FDMA signal. It will be appreciated that the term "cyclic prefix" refers to the prefixing of an OFDM symbol with a repetition of the symbol's end. The cyclic prefix acts as a guard interval, so as to eliminate inter-symbol interference from the previous symbol. It also allows the linear convolution of a channel to be modelled as circular convolution, which can be performed in the frequency domain with a discrete Fourier transform. This frequency-domain processing simplifies demodulation processes in an LTE receiver.

LTE random access can be either contention-based or contention-free. The contention-based random access procedure consists of four steps, as illustrated in FIG. 2. Note that only the first step involves physical-layer processing specifically designed for random access, while the remaining three steps follow the same physical-layer processing used in uplink and downlink data transmission. The eNodeB can order the UE, through a Physical Downlink Control Channel (PDCCH), to perform a contention based random access. The UE starts the random access procedure by randomly selecting one of the preambles available for contention-based random access. The UE then transmits the selected random access preamble on the PRACH to the eNodeB in the Radio Access Network (RAN), shown in FIG. 2 as step 1.

The RAN acknowledges any preamble it detects by transmitting a random access response, which includes an initial grant to be used on the uplink shared channel, a temporary Cell Radio Network Temporary Identification (C-RNTI) for the UE, and a timing advance (TA) update. The TA update is based on the timing offset of the preamble measured by the eNodeB on the PRACH. The random access response is transmitted in the downlink to the UE (step 2) and its corresponding PDCCH message cyclic redundancy code (CRC) is scrambled with a Random Access Radio Network Temporary Identifier (RA-RNTI).

After receiving the random access response, the UE uses the grant to transmit a message back to the RAN (step 3). This message is used, in part, to trigger the establishment of RRC and in part to uniquely identify the UE on the common channels of the cell. The timing advance command that was provided to the UE in the random access response is applied in the uplink transmission in message transmitted back to the RAN. The eNodeB can change the resources blocks that are assigned for transmission of this message of step 3 by sending an uplink grant having its CRC scrambled with a Temporary Cell Radio Network Temporary Identifier (TC-RNTI).

The procedure ends with the RAN solving any preamble contention that may have occurred for the case that multiple UEs transmitted the same preamble at the same time. This can occur when each UE randomly selects when to transmit and which preamble to use. If multiple UEs select the same preamble for the transmission at the same time on the Random Access Channel (RACH), there will be contention between these UEs. The RAN resolves this contention using the contention resolution message, seen as step 4 in FIG. 2. This message, which is sent by the eNodeB for contention resolution, has its PDCCH CRC scrambled with the C-RNTI if the UE previously has a C-RNTI assigned. If the UE does not have a C-RNTI previously assigned, its PDCCH CRC is scrambled with the TC-RNTI.

A scenario where contention occurs is illustrated in FIG. 3, where two UEs transmit the same preamble, $p_5$, at the same time. A third UE also transmits a random access preamble at the same time, but since it transmits with a different preamble, $p_1$, there is no contention between this UE and the other two UEs.

For contention-free random access, the UE uses reserved preambles assigned by the base station. In this case, contention resolution is not needed, and thus only steps 1 and 2 of FIG. 2 are required. A non-contention-based random access or contention-free random access can be initiated by the eNodeB, for example, to get the UE to achieve synchronization in the uplink. The eNodeB initiates a non-contention-based random access either by sending a PDCCH order or indicating it in an RRC message. The latter of these two approaches is used in the case of a handover.

The procedure for the UE to perform contention-free random access is illustrated in FIG. 4. As with the contention-based random access, the random access response is transmitted in the downlink to the UE and its corresponding PDCCH message CRC is scrambled with the RA-RNTI. The UE considers the contention resolution successfully completed after it has received the random access response successfully. For the contention-free random access, as for the contention-based random access, the random access response contains a timing alignment value. This enables the eNodeB to set the initial/updated timing according to the UEs transmitted preamble.

In NB-IoT, as with LTE, the random access procedure provides the means of synchronization to the uplink frame structure. A device initiates the random access procedure after synchronizing to the downlink frame structure. In the first step of the random access process, a device transmits a preamble. In the second step, the eNB detects the preamble time of arrival and signals a TA value to the UE. The UE thereafter uses the TA value to align any subsequent transmission to the uplink frame structure.

For NB-IoT as of Release 14 of the 3GPP specifications, the random access preamble transmitted by the UE comprises a random access symbol group that is constructed of five identical symbols and a cyclic prefix (See 3GPP TS 36.211 v 14.0.0, section 10.1.6.1). Each symbol in this random access symbol group corresponds to an unmodulated sinusoidal wave of frequency 3.75 kHz and periodicity 8192 Ts=266.7 microseconds, where Ts equals 1/(15000× 2048) seconds. The preamble is transmitted over a 3.75 kHz channel. Two CP lengths are supported, i.e. 66.7 microseconds (Format 0) and 266.7 microseconds (Format 1). For the 266.7 microsecond choice the CP is identical to a symbol. FIG. 5 illustrates the NB-IoT random access symbol group as specified in Release 14 of the 3GPP specifications. Depending on which CP length is used, the random access symbol group has a length of 1.4 or 1.6 milliseconds.

The NB-IoT minimum system bandwidth of 180 kHz is dividable into 48 sub-carriers, or tones. For a single NPRACH transmission, the symbol group shown in FIG. 5 is repeated four times, each time hopping (i.e., shifting in frequency) across at most seven sub-carriers. An example based on a configuration where a symbol group is 1.6 milliseconds long is shown in FIG. 6. This physical signal, also called a preamble, is uniquely defined by the first sub-carrier in the hopping pattern, i.e., the starting sub-carrier. In total, 48 orthogonal preambles can be defined, one for each available starting sub-carrier.

FIG. 6 illustrates a NPRACH resource intended for UEs in good radio conditions, where the random access frequency hopping symbol group (i.e., the sequence of four random access symbol groups) is sent a single time. An eNB may configure two additional NPRACH resources to be used by UEs in extended and extreme coverage. Each NPRACH resource is associated with a set of repetitions of the random access frequency hopping symbol group. FIG. 7 illustrates a typical NPRACH configuration with three resources for coverage level 0 (CE0), coverage level 1 (CE1), and coverage level 2 (CE2). As suggested by the three resources illustrated in FIG. 7, the number of repetitions increases with the coverage intended to be supported by the NPRACH resource. The UE measures the downlink received power and makes, based on this and a set of broadcasted signal level thresholds, a selection of which configured NPRACH resource to use for its system access, i.e., the number of times the random access frequency hopping symbol group should be repeated.

The Release 14 specifications for NB-IoT support up to 128 repetitions of the above-depicted random access frequency hopping symbol group. When repetitions are used, a pseudo-random frequency hop is performed between each pair of consecutive frequency hopping symbol groups. The signal generated across a set of repetitions will at most hop across 12 sub-carriers. The NPRACH configuration information discussed herein is transmitted by the eNB in the RadioResourceConfigCommonSIB-NB-r13 information element (IE), which is contained in SystemInformationBlockType2-NB (SIB2-NB).

While NB-IoT as specified in the Release 14 specifications supports indoor coverage in the most extreme scenarios, through support for a high maximum coupling loss, the feature has not been designed to support cells with a radius of more than 40 kilometers. For Release 15, it is now proposed to introduce extended cell range for NB-IoT, to facilitate usage also in rural areas without any limitations. This extended cell range may have an impact on several NB-IoT parameters or procedures, including those related to the random access procedure.

SUMMARY

Techniques and an apparatus for generating and using new formats for a random access preamble signal are disclosed herein. These formats are appropriate for the physical random access channel (PRACH) of NB-IoT and, in some embodiments, fit in the structure defined for NB-IoT PRACH in Release 13 of the 3GPP specifications.

According to some embodiments, a method in a wireless device operating in a wireless network includes generating a random access preamble signal and transmitting the random access preamble signal, where the generated random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1. According to some of these and some other embodiments, the generated random access preamble signal comprises a random access symbol group that comprises a plurality of consecutive symbols, the plurality of consecutive symbols comprising at least three consecutive symbols, where each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

According to some embodiments, a method in a wireless access node operating in a wireless network includes receiving a radio frequency signal and detecting a random access preamble signal in the received radio frequency signal, where the detected random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1. In some of these and in some other embodiments, the generated random access preamble signal comprises a random access symbol group that comprises a plurality of consecutive symbols, the plurality of consecutive symbols comprising at least three consecutive symbols, wherein each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

According to some embodiments, a wireless device for operating in a wireless network is adapted to generate a random access preamble signal and transmit the random access preamble signal. The generated random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

According to other embodiments, the generated random access preamble signal comprises a random access symbol group that comprises a plurality of consecutive symbols, the plurality of consecutive symbols comprising at least three consecutive symbols, where each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

According to some embodiments, a wireless access node for operating in a wireless network is adapted to receive a radio frequency signal and detect a random access preamble signal in the received radio frequency signal. The detected random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

According to other embodiments, the detected random access preamble signal comprises a random access symbol group that comprises a plurality of consecutive symbols, the plurality of consecutive symbols comprising at least three consecutive symbols, wherein each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

According to some embodiments, a wireless device includes a radio transceiver adapted to communicate with a wireless network and one or more processing circuits adapted to carry out the methods in the user equipment described above and detailed below. Likewise, an example wireless access node comprises a radio transceiver adapted to communicate with one or more wireless devices, and one or more processing circuits adapted to carry out the methods in the wireless access node described above and detailed below.

Further embodiments may include computer program products and non-transitory computer readable media that store instructions that, when executed by processing circuit, perform the operations of the embodiments describe above.

Details of several embodiments of techniques and apparatuses for performing random access procedures are described and illustrated below.

BRIEF DESCRIPTION OF THE DRAWINGS

FIG. 10 shows a matrix used to determine intra-group frequency hopping patterns.

DETAILED DESCRIPTION

Figure 1:
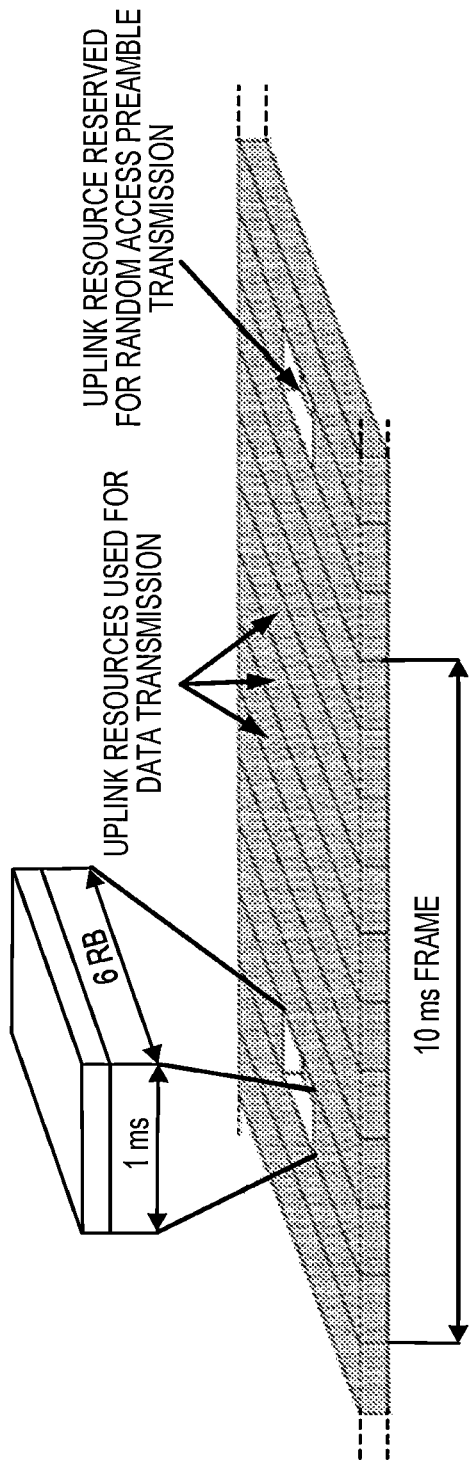
FIG. 1 is a diagram illustrating random access preamble transmission.
Figure 2:
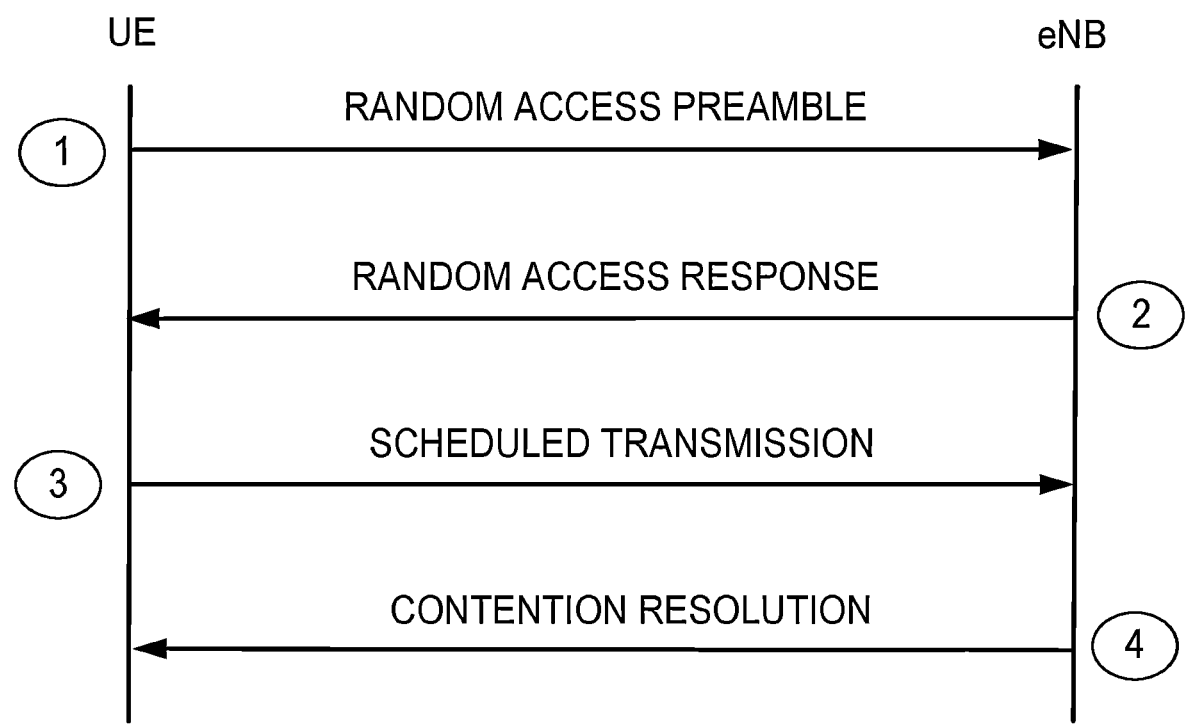
FIG. 2 is a diagram illustrating signaling for the contention-based random access procedure in LTE.
Figure 3:
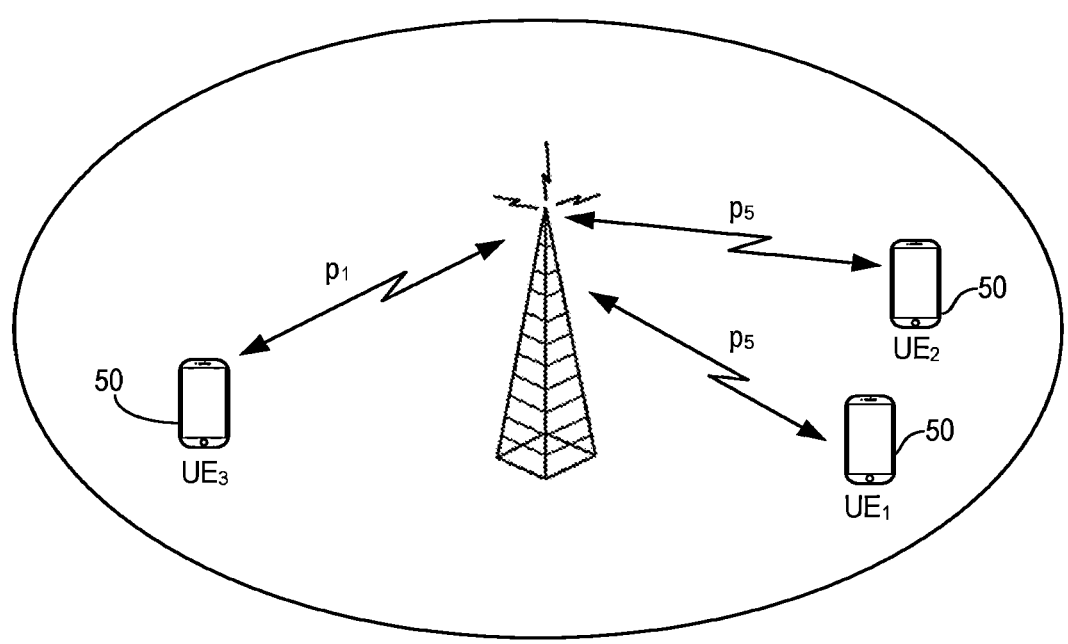
FIG. 3 illustrates contention based random access, where there is contention between UEs.
Figure 4:
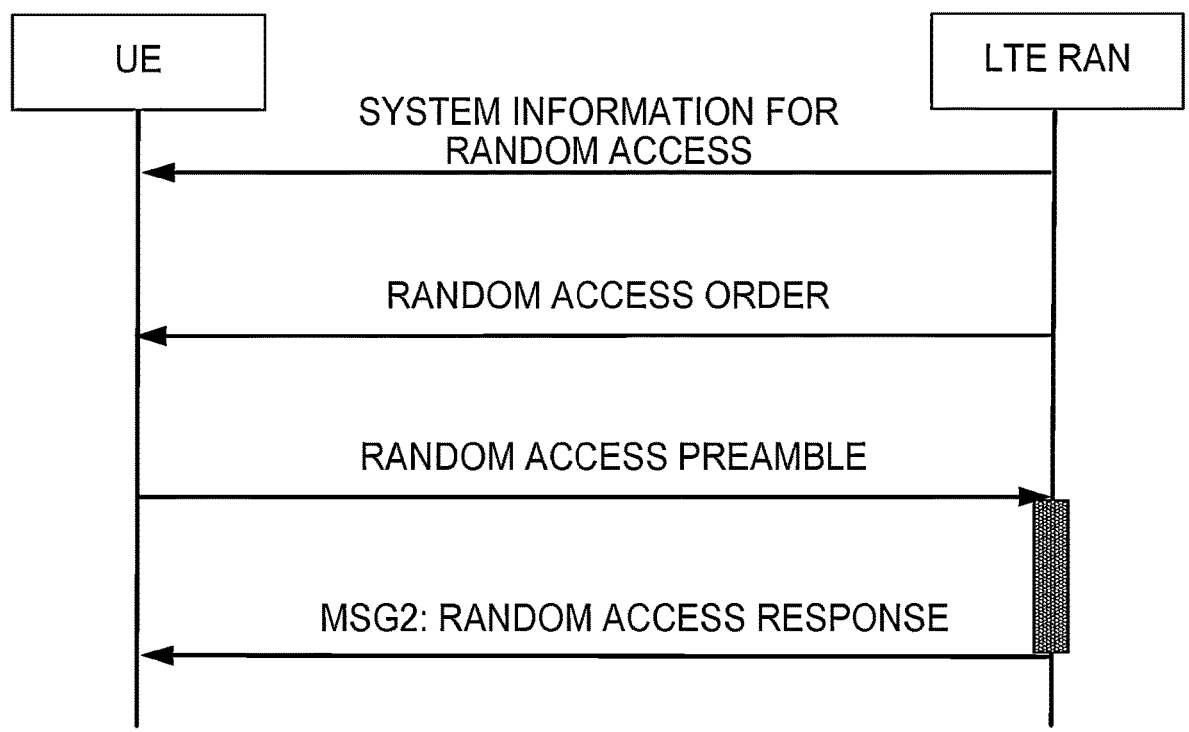
FIG. 4 is a diagram illustrating signaling over the air interface for the contention-free random access procedure in LTE.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, embodiments of the present inventive concepts are described herein in the context of operating in or in association with a RAN that communicates over radio communication channels with mobile terminals, also interchangeably referred to as wireless terminals or UEs, using a particular radio access technology. More specifically, embodiments are described in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

Note that in some of the embodiments described herein, the terms "user equipment" and "UE" are used. A UE, as that term is used herein, can be any type of wireless device capable of communicating with a network node or another UE over radio signals. In the context of the present disclosure, it should be understood that a UE may refer to a machine-to-machine (M2M) device, a machine-type communications (MTC) device, and/or a NB-IoT device, where the UE has no "user" in the sense of an individual person owning and/or operating the device. A UE may also be referred to as a wireless device, a radio device, a radio communication device, a wireless terminal, or simply a terminal—unless the context indicates otherwise, the use of any of these terms is intended to include device-to-device UEs, machine-type UEs or UEs capable of machine-to-machine communication, sensors equipped with a UE, wireless-enabled table computers, mobile terminals, smart phones, laptop-embedded equipped (LEE), laptop-mounted equipment (LME), USB dongles, wireless customer-premises equipment (CPE), etc. In the discussion that follows, the terms M2M device, MTC device, wireless sensor, and sensor may also be used. It should be understood that these devices are UEs, but are generally configured to transmit and/or receive data without direct human interaction.

In the existing LTE random access design, random access serves multiple purposes such as initial access when establishing a radio link, scheduling request, etc. Among others, a main objective of random access is to achieve uplink synchronization, which is important for maintaining the uplink orthogonality in LTE. To preserve orthogonality among different UEs in an OFDM or SC-FDMA system, the time of arrival of each UE signal needs to be within the cyclic prefix (CP) of the OFDM or SC-FDMA signal.

As discussed in the Background section above, the current NPRACH preamble basic waveform (as of Release 14 of the 3GPP specifications) is a sinusoid of 3.75 kHz with periodicity 266.7 microseconds. A UE that is 40 kilometers from the eNB will have a round trip time of $2 \times 40000/c = 266.7$ microseconds, i.e., exactly the NPRACH preamble periodicity. (Here c equals the speed of light, i.e. $3 \times 10^8$ m/s.) This implies that an eNB receiver that detects a received preamble and its timing based on a correlation between a known reference waveform and the received waveform will have difficulties to distinguish a preamble transmitted by a UE at a distance of 40000+x meters from a preamble transmitted by a UE at a distance x meters from the eNB. This ambiguity is a direct consequence of building the preamble as a simple periodic waveform.

This problem is addressed by the several techniques described herein, which include the introduction and use of a new waveform for the NPRACH preamble, which supports extended cell range for NB-IoT. This new waveform is backwards compatible in the sense that it fits into the Release 13 NB-IoT channel structure. This new waveform may be generally referred to as NPRACH preamble Format 2, extending the existing Rel-13 NPRACH preamble Format 0 and Format 1. An important advantage of several of the variations and embodiments described below is that they support an extended cell range.

Several embodiments of the present techniques follow from defining the NPRACH preamble basic waveform more flexibly than is done in Release 13 of the 3GPP specifications, i.e., as a truncated sinusoid of 3.75/N kHz, with a periodicity or symbol length of $N/(3.75 \times 10^3)$ seconds. In some embodiments, N is an integer greater than 1, while in others N may be a non-integer. Note that if N=1, the result is the Release 13 NPRACH basic preamble waveform, i.e., a symbol of 266.7 microseconds, consisting of a truncated 3.75 kHz sinusoid. When 6/N is an integer, a random access symbol group consisting of 6/N such symbols fits evenly into the Release 13 NPRACH random access group length of 1.6 milliseconds.

In some embodiments, then a basic preamble waveform according to N=2 is used, for at least some random access attempts. This means that the NPRACH preamble basic waveform, or symbol, is defined as a truncated sinusoid of 1.875 kHz, with periodicity, or symbol length, of $1/(1.875 \times 10^3)$ seconds=533.3 microseconds. (Here, as elsewhere, representations of time in microseconds may be approximations.) Further, a random access symbol group consisting of three such symbols fits evenly into the Release 13 NPRACH format of length 1.6 milliseconds. Note that the same 3.75 kHz subcarrier spacing used for Release 13 NB-IoT is assumed here, although the applicability of the presently disclosed techniques is not limited to this subcarrier spacing. The first symbol can be used as a cyclic prefix, as exemplified in FIG. 8, which illustrates both a Release 13 NPRACH random access symbol group (i.e., N=1) and an example random access symbol group with a basic waveform defined as a truncated sinusoid of 3.75/2 kHz and a symbol length of $2/(3.75 \times 10^3)$, i.e., N=2. It will be appreciated that with this definition of the basic symbol waveform, the length of the symbol is doubled, and a cell size of 80 kilometers is supported.

Figure 8:
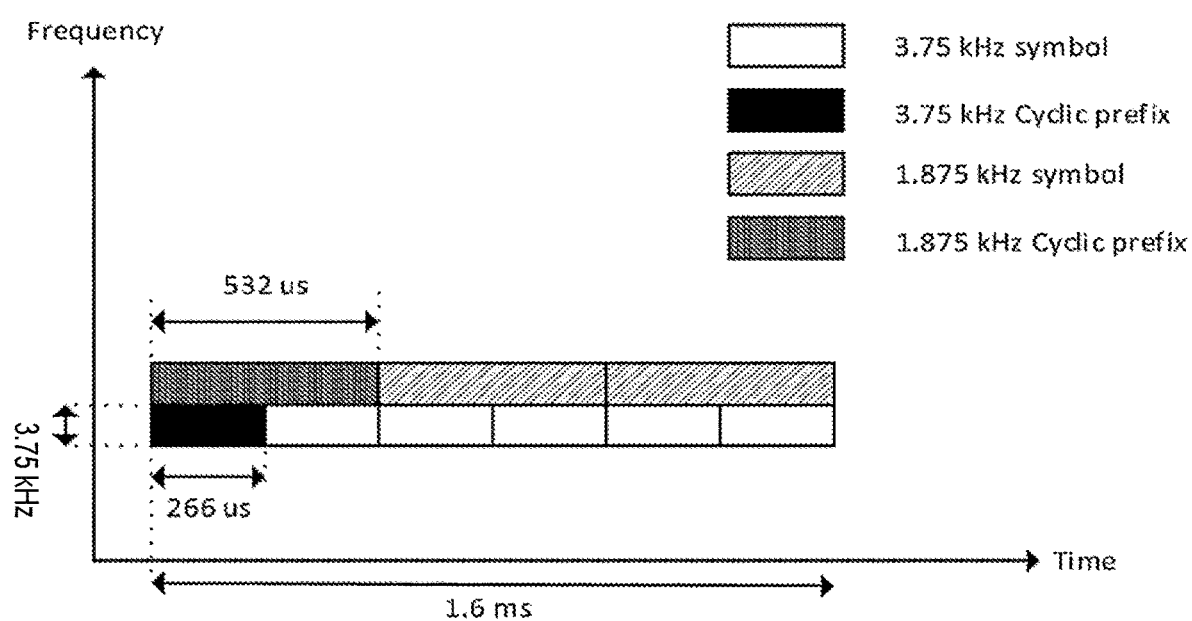
FIG. 8 illustrates symbol groups of length 1.6 milliseconds, using either a 3.75 kHz waveform or a 1.875 kHz waveform.

In some implementations or embodiments of the present techniques a single wireless device may be configured, e.g., at various times or under various differing circumstances, to use one preamble basic waveform at one instance, and another at a different instance. For example, a wireless device may be configured to switch between the use of a Release 13 NPRACH random access symbol and a random access symbol defined by N=2, as illustrated in FIG. 8. In various embodiments, the selection between these two waveforms (or from among more or different waveforms) may be triggered by messaging or signaling from the network, for example.

In some embodiments, a range of new preambles may be supported by a wireless device or an access node (e.g., an eNB), such as a range of new preambles defined by the sinusoid of 3.75/N kHz, as above, where N is a member of the set {1.5, 2, 2.5, 3}. In some embodiments, the eNB (or other wireless access node) signals which preamble format is to be used, in a system information element, such as the RadioResouceConfigCommonSIB-NBinformation element. In embodiments where multiple preamble formats are supported, the configured preamble format can be indicated using an indication of N, where N determines the basic preamble waveform as described above.

Figure 7:
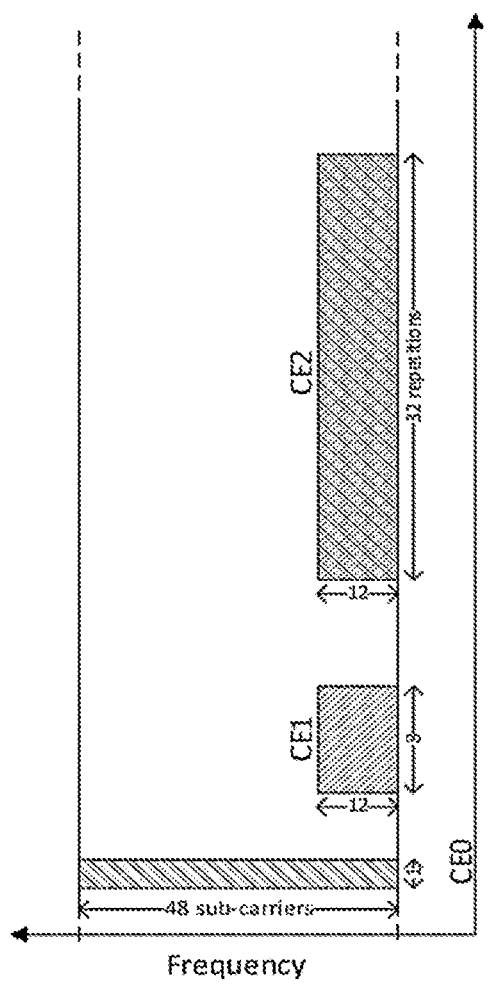
FIG. 7 illustrates a typical NPRACH configuration with three resources for different coverage levels.

In some embodiments, the eNB (or other wireless access node) configures a distinct preamble format for some or all of the NPRACH radio resources that can be used by UEs, in different coverages. Thus, for example, referring back to FIG. 7, one or all of the configured resources, for CE0, CE1, and CE2, may be configured with a preamble format, i.e., with a basic preamble waveform, that differs from the others. In this case, the use of a given basic preamble waveform depends on which configured resource is used, which in turn depends on the coverage level.

In some embodiments, the UE (or other wireless device) selects the NPRACH radio resource and the preamble format to use when accessing the system based on estimated downlink signal level and the set of broadcasted signal level thresholds for selection of the NPRACH resource. It should be appreciated that this does not exclude that the UE uses other information to select the NPRACH resource. In some of these embodiments, the association between each of the configured NPRACH radio resources is configured, as discussed above, such that selecting the NPRACH radio resource means that the associated preamble format is used. In other embodiments, the NPRACH radio resource and the preamble format may be separately selected, based on downlink signal level and/or some other factor.

In some embodiments, the network uses Radio Resource Control (RRC) control signaling to mandate a UE (or other wireless device) to use a certain preamble format.

Figure 5:
FIG. 5 is a diagram illustrating a Narrowband Internet of Things (NB-IoT) random access symbol group as of Release 14 of the 3GPP specifications.
Figure 6:
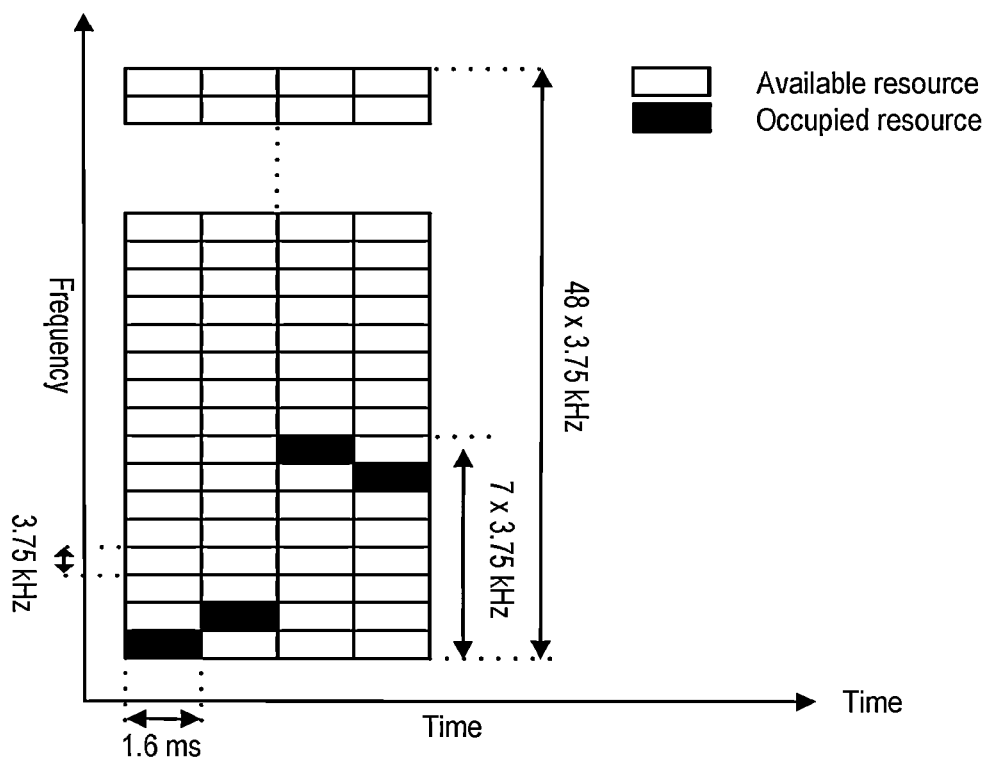
FIG. 6 illustrates a NB-IoT random access preamble, comprising four frequency-hopped repetitions of a random access symbol group.

In some embodiments, a new hopping pattern is designed for the symbols within a given symbol group. In other words, symbols in the same symbol group may use different tones (i.e., different subcarriers in an OFDMA/SC-FDMA time-frequency resource structure). This is in distinct contrast to the Release 13 NPRACH symbol group, as illustrated in FIG. 5, which uses the same tone for each symbol in the random access symbol group. It will be appreciated that this technique of varying the tone used for symbols within a random access symbol group may be applied to the basic preamble waveform as defined in Release 13 of the 3GPP specifications, as well as to any of the other basic preamble waveforms described herein.

Figure 9:
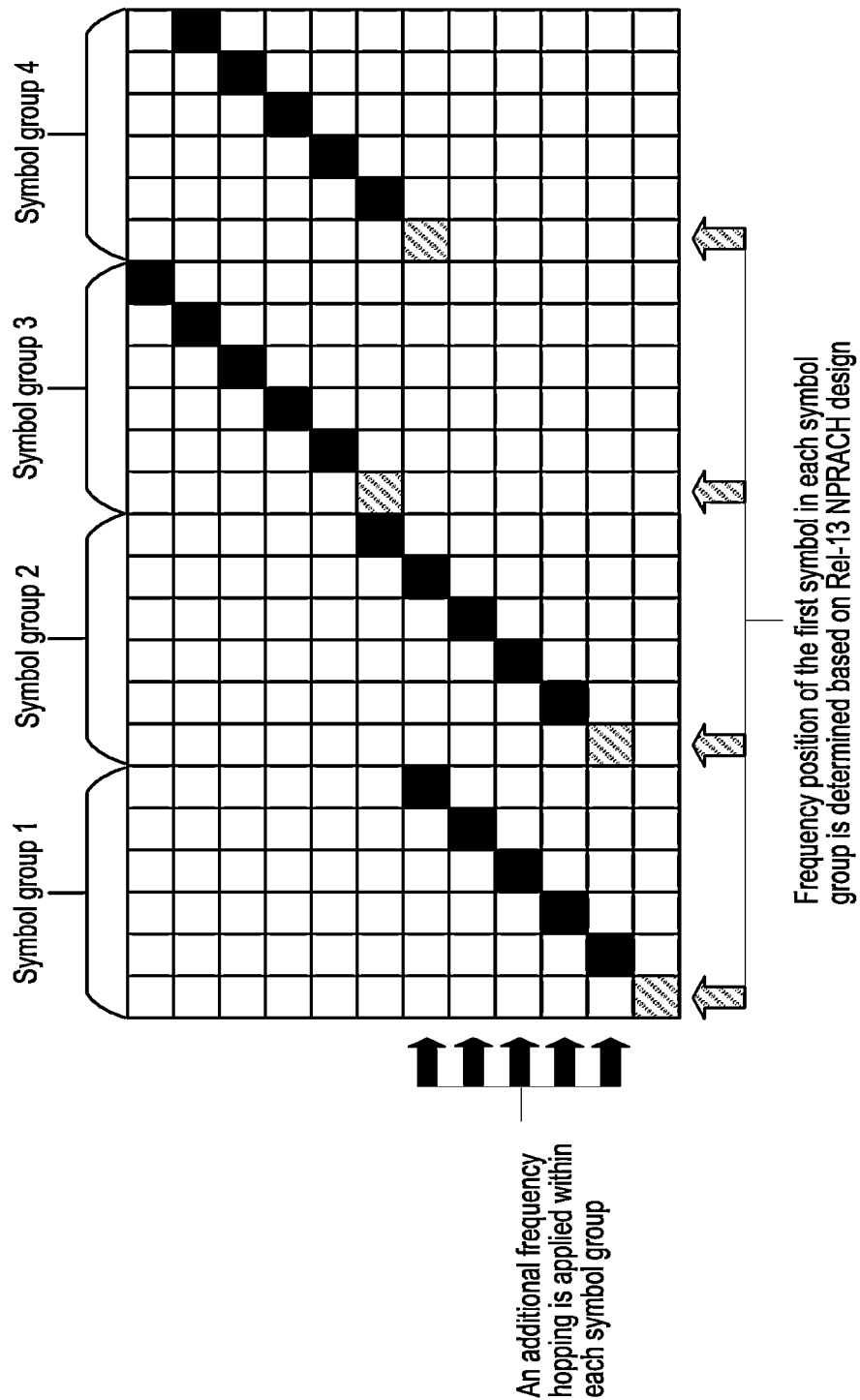
FIG. 9 illustrates an example random access symbol group using intra-group frequency hopping.

Following are two specific embodiments of a new intra-group hopping pattern, as described above. In a first example, the frequency position of the first symbol in each symbol group is determined based on the Release 13 NPRACH design. A linear hopping with a constant hopping offset is applied to the remaining symbols in the same symbol group. The constant hopping offset value (in terms of number of tones) can be chosen from the set {1, 2, 3, 4, 5, 6, 7, 8, 9, 10, 11}. FIG. 9 illustrates an example of this approach, where the linear hopping offset value used is 1.

Figure 11:
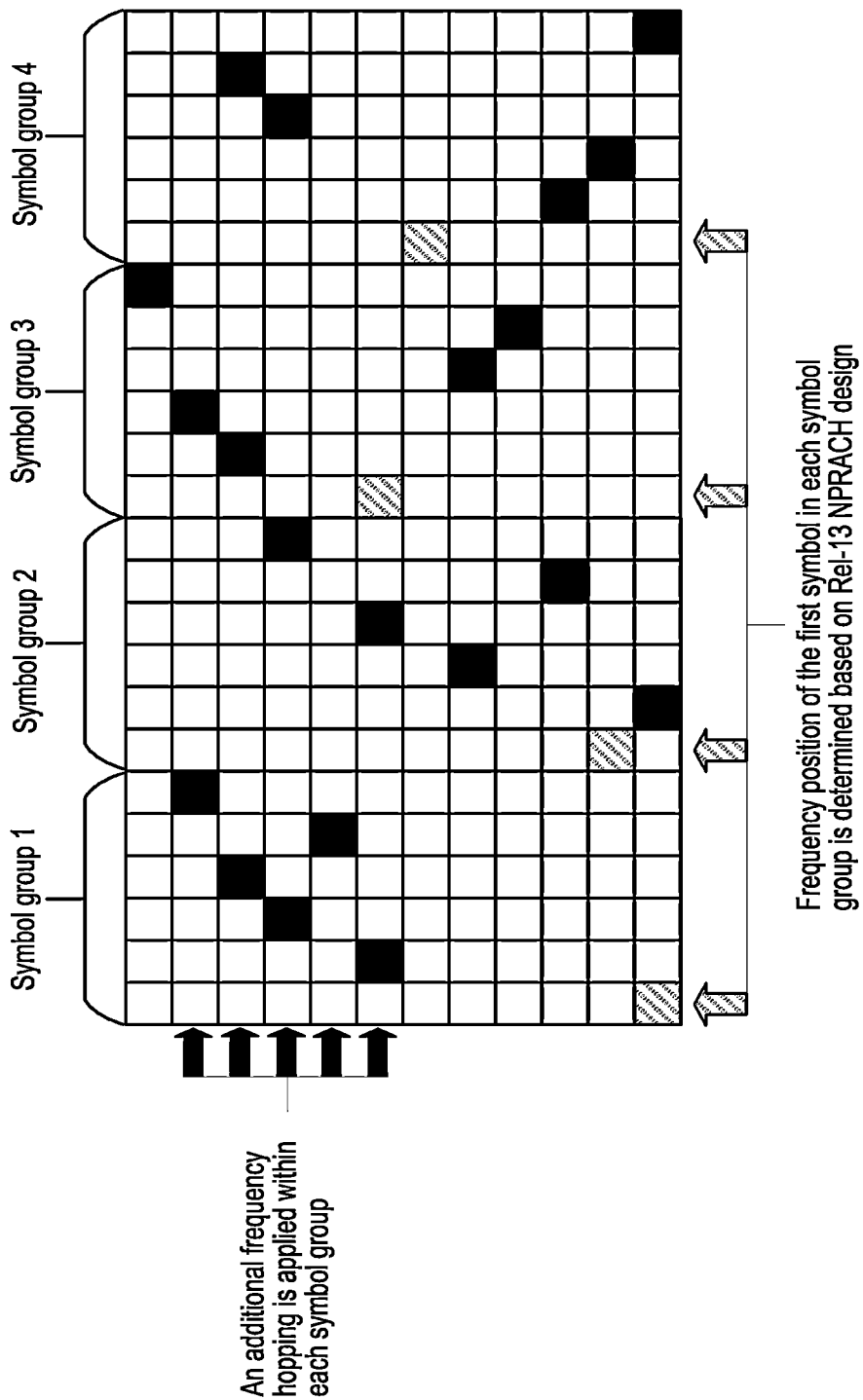
FIG. 11 illustrates a preamble comprising four random access symbol groups with intra-group frequency hopping.

In another example, the frequency position of the first symbol in each symbol group is again determined based on the Release 13 NPRACH design. In this case, however, the hopping of the remaining symbols in a symbol group is then determined by a pre-determined/pre-configured hopping matrix, such as the hopping matrix shown in FIG. 10. In the matrix shown in FIG. 10, each row represents a subcarrier, each column represents a symbol interval, and squares indicated with the same number represent symbols from the same symbol group. For example, if the first symbol uses the bottom most subcarrier (subcarrier 12), then the subcarriers used by the remaining five symbols are subcarrier 6, 4, 3, 5, and 2. This hopping matrix is designed such that every preamble is adjacent to any other given preamble at most once (i.e., for only one symbol time), to minimize adjacent interference. FIG. 11 illustrates an example of the frequency-hopping for a preamble comprising four random access symbol groups according to this approach and using the matrix shown in FIG. 10.

It should be appreciated that in some embodiments in which there is intra-group hopping, as discussed above, there may be several possible patterns, such that the pattern to apply is signaled to a UE by the network, e.g., via system information or via RRC signaling, in manners similar to those described above for the selection among two or more basic preamble waveforms. In some embodiments, both the preamble waveform and the hopping pattern may be configurable and/or selectable from among various possibilities, either individually or in combination. Note also that the intra-group hopping can be applied in embodiments where the 3.75 kHz subcarrier spacing described above is used, as in the Release 13 NPRACH, or one or more new subcarrier spacings may be used.

In view of the detailed examples provided above, it will be appreciated that embodiments of the presently disclosed techniques include, but are not limited to, the following numbered examples of methods that may be carried out by a wireless device, such as a UE configured for operation according to specifications for NB-IoT.

Figure 12:
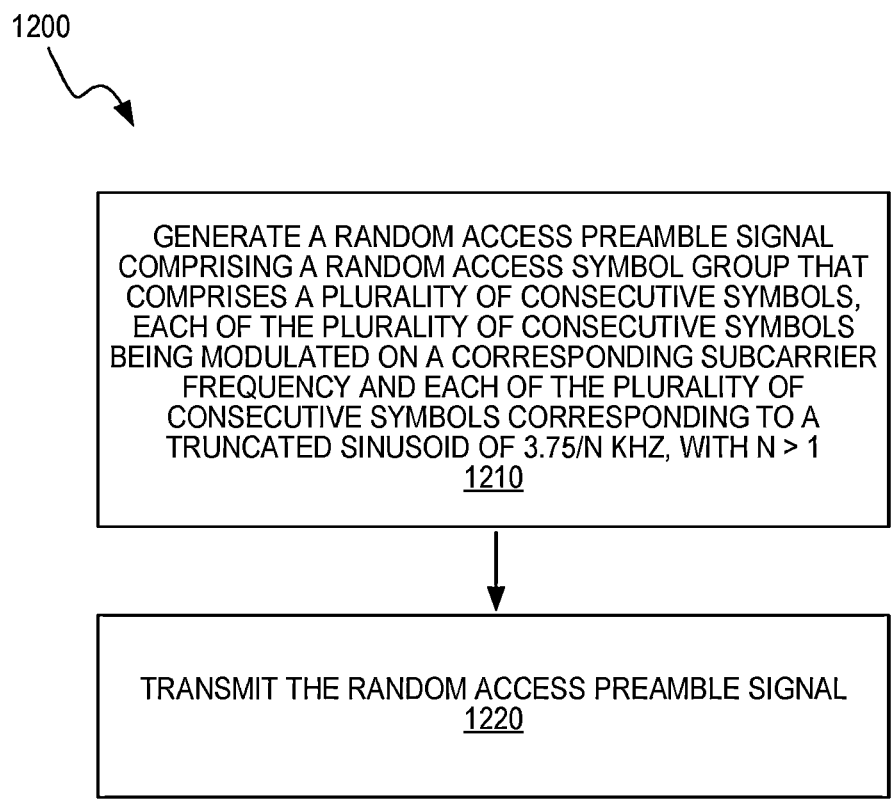
FIG. 12 is a flowchart illustrating a method in a wireless device, according to some embodiments.

FIG. 12 is a process flow diagram illustrating a method 1200 in a wireless device (e.g., UE) operating in a wireless network, according to some embodiments. The method includes generating a random access preamble signal (block 1210) and transmitting the random access preamble signal (block 1220). The generated random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

N may be, for example, 2 or one of 1.5, 2, 2.5, 3.6/N may be an integer, where the random access symbol group consists of 6/N symbols. Subcarrier frequencies of the random access preamble signal may be spaced by 3.75 kHz or 3.75/N kHz.

In some cases, the plurality of consecutive symbols of the random access symbol group may all be modulated on a single subcarrier frequency. In other cases, one or more of the plurality of consecutive symbols of the random access symbol group may be modulated on a first subcarrier frequency and one or more others of the plurality of consecutive symbols of the random access symbol group are modulated on a second subcarrier frequency, differing from the first subcarrier frequency. Each of the plurality of consecutive symbols of the random access symbol group may be modulated on a different subcarrier frequency than all others of the plurality of consecutive symbols of the random access symbol group. Each of all but a first one of the plurality of consecutive symbols of the random access symbol group may be modulated on a subcarrier frequency that is offset by a predetermined number of subcarrier spacings from the subcarrier frequency for the preceding one of the plurality of consecutive symbols. The predetermined number of subcarrier spacings may be one of the set: {1, 2, 3, 4, 5, 6, 7, 8, 9, 10, 11}.

In the case where each of the plurality of consecutive symbols of the random access symbol group is modulated on a different subcarrier frequency than all others of the plurality of consecutive symbols of the random access symbol group, a mapping of the plurality of consecutive symbols of the random access symbol group to subcarrier frequencies may be determined by a hopping matrix, where the hopping matrix defines multiple mapping patterns that each depend on a subcarrier frequency for a first one of the plurality of consecutive symbols of the random access symbol group.

The hopping matrix may be defined such that any random access symbol group defined by the hopping matrix is adjacent to any other random access symbol group defined by the hopping matrix for no more than one symbol time. The hopping matrix may also be defined according to FIG. 10, where the horizontal axis in the hopping matrix illustrated in FIG. 10 corresponds to symbols and the vertical axis corresponds to subcarrier frequencies, and wherein each of twelve intra-group hopping patterns is identified by boxes containing the same value. In other words, the hopping matrix comprises a horizontal axis that corresponds to symbols and a vertical axis that corresponds to subcarrier frequencies, and where each of a plurality (e.g., twelve) of intra-group hopping patterns is identified in the hopping matrix by a given value that is the same among random access symbols of the same intra-group hopping pattern, and wherein each intra-group hopping pattern has a different value. For instance, the intra-group hopping pattern for group number 12 is shown by the darkened boxes labeled "12" in FIG. 10.

Also, as shown by FIG. 10, the random access symbol group is defined in a hopping matrix such that each of the intra-group hopping patterns in the hopping matrix does not have two random access symbols that are adjacent to one another along the vertical axis or the horizontal axis of the hopping matrix.

The method 1200 may further include receiving, from the wireless network, an indication of N. The indication of N is received via RRC signaling or system information broadcast signaling. N may be determined by which of a plurality of pre-configured random access resources is to be used for the transmitting of the random access preamble signal.

The generated random access preamble signal may further include one or more repetitions of the random access symbol group. Each repetition of the random access symbol group may begin on a different subcarrier frequency than the immediately preceding random access symbol group. The method 1200 may further include receiving, from the wireless network, an indication of a number of the repetitions.

Figure 13:
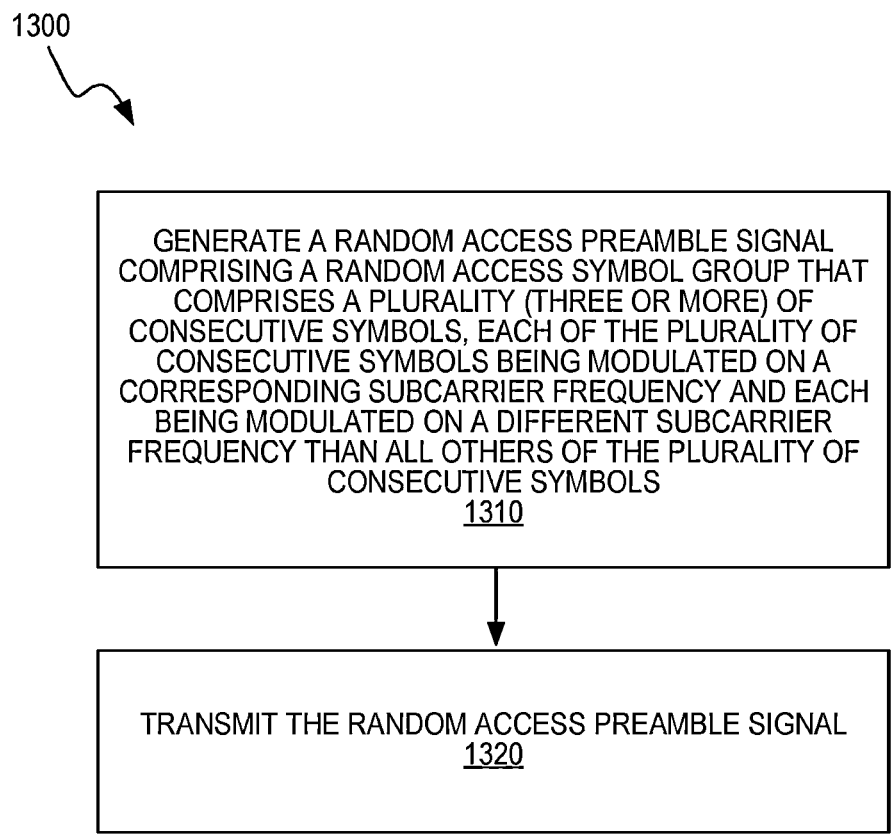
FIG. 13 is a flowchart illustrating another method in a wireless device, according to some embodiments.

FIG. 13 illustrates another method 1300 in a wireless device operating in a wireless network. The method includes generating a random access preamble signal (block 1310) and transmitting the random access preamble signal (block 1320). The generated random access preamble signal comprises a random access symbol group that comprises a plurality of consecutive symbols, the plurality of consecutive symbols comprising at least three consecutive symbols. Each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

Each of all but a first one of the plurality of consecutive symbols of the random access symbol group may be modulated on a subcarrier frequency that is offset by a predetermined number of subcarrier spacings from the subcarrier frequency for the preceding one of the plurality of consecutive symbols. The predetermined number of subcarrier spacings may be one of the set: {1, 2, 3, 4, 5, 6, 7, 8, 9, 10, 11}.

A mapping of the plurality of consecutive symbols of the random access symbol group to subcarrier frequencies may be determined by a hopping matrix, where said hopping matrix defines multiple mapping patterns that each depend on a subcarrier frequency for a first one of the plurality of consecutive symbols of the random access symbol group. The hopping matrix may be defined such that any random access symbol group defined by the hopping matrix is adjacent to any other random access symbol group defined by the hopping matrix for no more than one symbol time.

The hopping matrix may be defined according to FIG. 10, where the horizontal axis in the hopping matrix illustrated in FIG. 10 corresponds to symbols and the vertical axis corresponds to subcarrier frequencies, and wherein each of twelve intra-group hopping patterns is identified by boxes containing the same value. Each of a plurality of intra-group hopping patterns may be identified in the hopping matrix by a given value that is the same among random access symbols of the same intra-group hopping pattern, where each intra-group hopping pattern has a different value.

Figure 14:
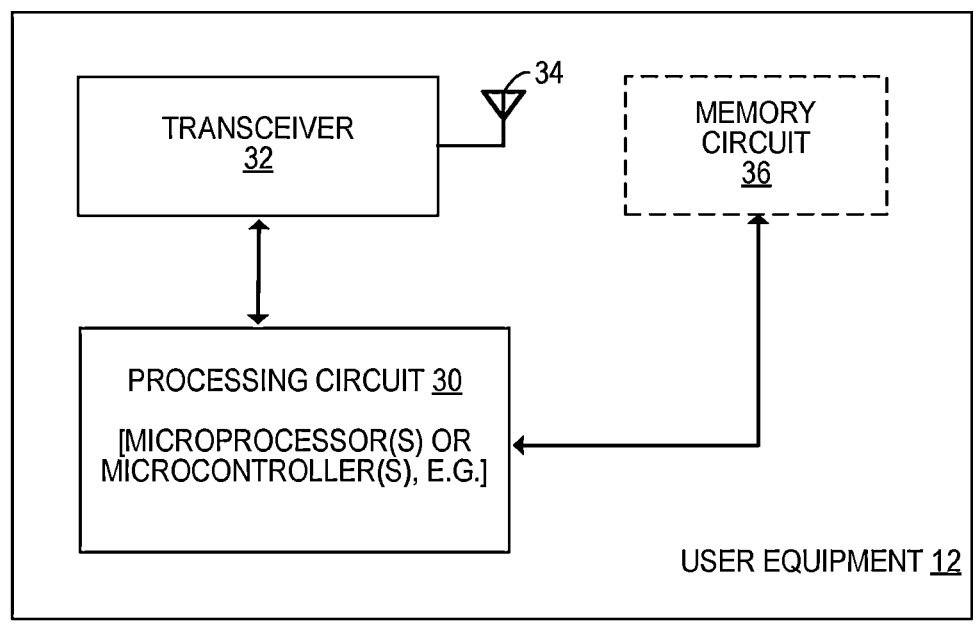
FIG. 14 is a block diagram of a wireless device configured to carry out one or more of the techniques described herein.

FIG. 14 shows an example radio device, here illustrated as a UE 12, which may be more generally referred to a wireless device and which can be used in one or more of the example embodiments described herein. The UE 12 may in some embodiments be a mobile device that is configured for operation according to specifications for NB-IoT. The UE 12 comprises a processing circuit 30 that controls the operation of the UE 12. The processing circuit 30, which may comprise one or more microprocessors, microcontrollers, digital signal processors, specialized digital logic, etc., for example, is connected to a receiver or transceiver circuit 32 with associated antenna(s) 34, which are used to receive signals from or both transmit signals to and receive signals from a base station 10 in the network. The UE 12 also comprises a memory circuit 36 that is connected to the processing circuit 30 and that stores program code and other information and data required for the operation of the UE 12. Together, the processing circuit 30 and memory circuit 36 may also be referred to as a processing circuit, and are adapted, in various embodiments, to carry out one or more of the wireless device-based techniques described herein.

For example, the processing circuit 30 of UE 12 may be configured to generate a random access preamble signal and transmit the random access preamble signal. The generated random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of $3.75/N$ kHz, with $N>1$. Similarly, the processing circuit 30 of UE 12 may be configured to generate a random access preamble signal and transmit the random access preamble signal, but in this case, the generated random access preamble signal comprises a random access symbol group that comprises a plurality of consecutive symbols, the plurality of consecutive symbols comprising at least three consecutive symbols. Each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

More generally, a wireless device may include a radio transceiver adapted to communicate with a wireless network and further comprise one or more processing circuits adapted to carry out the methods described herein.

In another example, the processing circuit 30 of the UE 12 is configured to generate a random access preamble signal and transmit the random access preamble signal, where the generated random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

Figure 15:
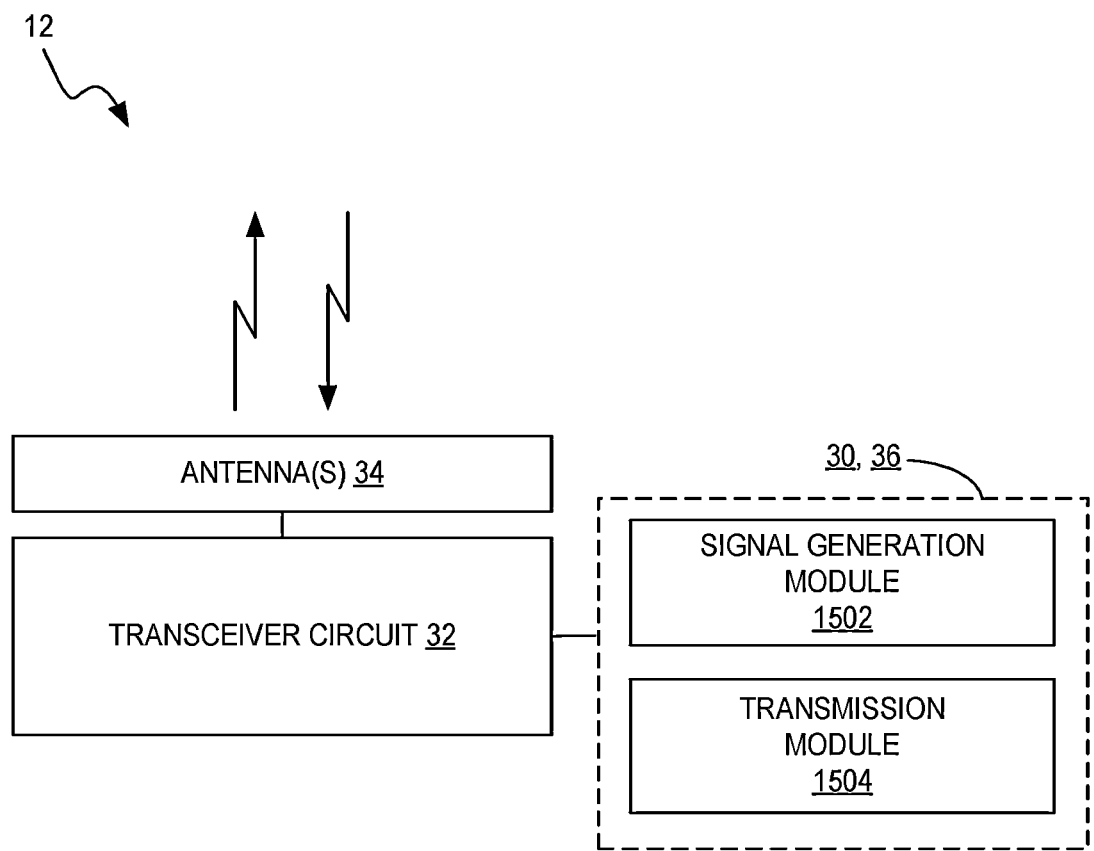
FIG. 15 is a block diagram of a functional implementation of a wireless device, according to some embodiments.

As shown in FIG. 15, a wireless device, such as UE 12, may include a signal generation module 1502 for generating a random access preamble signal and a transmission module 1504 for transmitting the random access preamble signal. In some cases, the signal generation module is configured such that the generated random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

In other cases, the generated random access preamble signal comprises a random access symbol group that comprises a plurality of consecutive symbols, the plurality of consecutive symbols comprising at least three consecutive symbols, where each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

Figure 16:
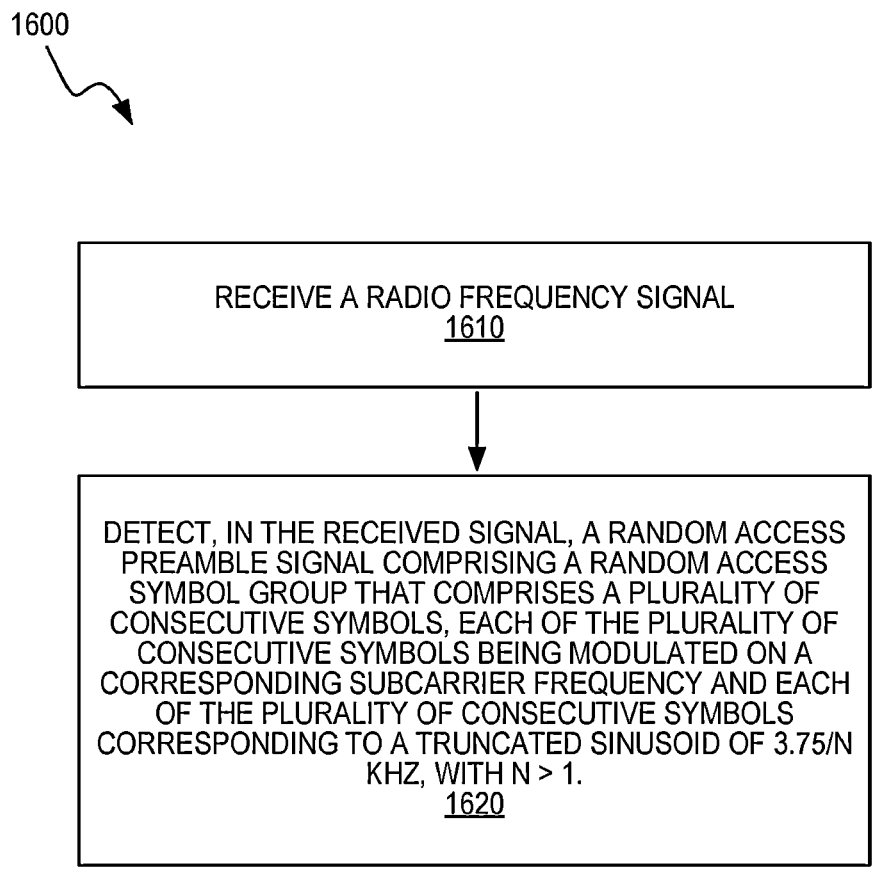
FIG. 16 is a flowchart illustrating a method in a wireless access node, according to some embodiments.

The above discussion has focused primarily on the wireless device that generates and transmits the random access preamble signal. It will be appreciated that corresponding techniques and apparatus apply to the wireless access node (e.g., an eNB) that receives and detects the random access preamble. FIG. 16 illustrates a method 1600 in a wireless access node operating in a wireless network. The method includes receiving a radio frequency signal (block 1610) and detecting a random access preamble signal in the received radio frequency signal (1620). The detected random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

N may be, for example, 2 or one of 1.5, 2, 2.5, 3.6/N may be an integer, where the random access symbol group consists of 6/N symbols. Subcarrier frequencies of the random access preamble signal may be spaced by 3.75 kHz or 3.75/N kHz.

In some cases, the plurality of consecutive symbols of the random access symbol group may all be modulated on a single subcarrier frequency. In other cases, one or more of the plurality of consecutive symbols of the random access symbol group may be modulated on a first subcarrier frequency and one or more others of the plurality of consecutive symbols of the random access symbol group are modulated on a second subcarrier frequency, differing from the first subcarrier frequency. Each of the plurality of consecutive symbols of the random access symbol group may be modulated on a different subcarrier frequency than all others of the plurality of consecutive symbols of the random access symbol group. Each of all but a first one of the plurality of consecutive symbols of the random access symbol group may be modulated on a subcarrier frequency that is offset by a predetermined number of subcarrier spacings from the subcarrier frequency for the preceding one of the plurality of consecutive symbols. The predetermined number of subcarrier spacings may be one of the set: {1, 2, 3, 4, 5, 6, 7, 8, 9, 10, 11}.

In the case where each of the plurality of consecutive symbols of the random access symbol group is modulated on a different subcarrier frequency than all others of the plurality of consecutive symbols of the random access symbol group, a mapping of the plurality of consecutive symbols of the random access symbol group to subcarrier frequencies may be determined by a hopping matrix, where the hopping matrix defines multiple mapping patterns that each depend on a subcarrier frequency for a first one of the plurality of consecutive symbols of the random access symbol group. The hopping matrix may be defined such that any random access symbol group defined by the hopping matrix is adjacent to any other random access symbol group defined by the hopping matrix for no more than one symbol time.

The hopping matrix may also be defined according to FIG. 10, where the horizontal axis in the hopping matrix illustrated in FIG. 10 corresponds to symbols and the vertical axis corresponds to subcarrier frequencies, and wherein each of twelve intra-group hopping patterns is identified by boxes containing the same value. Each of a plurality of intra-group hopping patterns may be identified in the hopping matrix by a given value that is the same among random access symbols of the same intra-group hopping pattern, where each intra-group hopping pattern has a different value.

The detected random access preamble signal may further comprise one or more repetitions of the random access symbol group. Each repetition of the random access symbol group may begin on a different subcarrier frequency than the immediately preceding random access symbol group.

Figure 17:
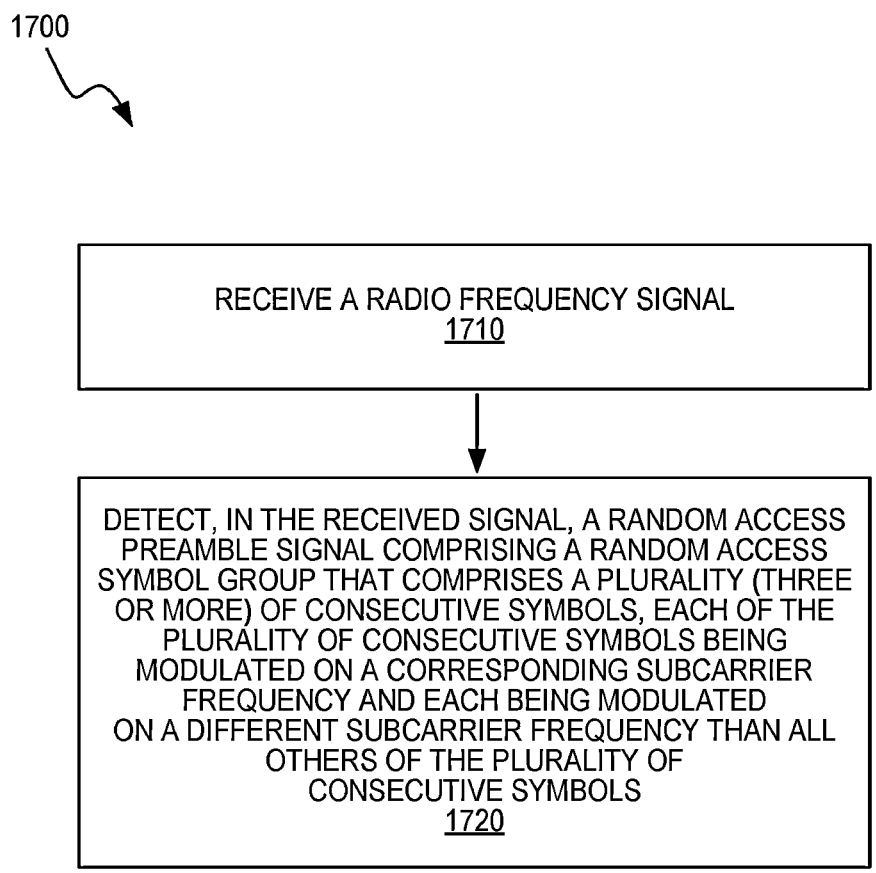
FIG. 17 is a flowchart illustrating another method in a wireless access node, according to some embodiments.

FIG. 17 illustrates another method 1700 in a wireless access node operating in a wireless network. The method 1700 includes receiving a radio frequency signal (block 1710) and detecting a random access preamble signal in the radio frequency signal (block 1720). The detected random access preamble signal comprises a random access symbol group that comprises a plurality of consecutive symbols, the plurality of consecutive symbols comprising at least three consecutive symbols, where each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

Each of all but a first one of the plurality of consecutive symbols of the random access symbol group may be modulated on a subcarrier frequency that is offset by a predetermined number of subcarrier spacings from the subcarrier frequency for the preceding one of the plurality of consecutive symbols. The predetermined number of subcarrier spacings may be one of the set: {1, 2, 3, 4, 5, 6, 7, 8, 9, 10, 11}.

A mapping of the plurality of consecutive symbols of the random access symbol group to subcarrier frequencies may be determined by a hopping matrix, wherein said hopping matrix defines multiple mapping patterns that each depend on a subcarrier frequency for a first one of the plurality of consecutive symbols of the random access symbol group. The hopping matrix may be defined such that any random access symbol group defined by the hopping matrix is adjacent to any other random access symbol group defined by the hopping matrix for no more than one symbol time.

The hopping matrix may also be defined according to FIG. 10, where the horizontal axis in the hopping matrix illustrated in FIG. 10 corresponds to symbols and the vertical axis corresponds to subcarrier frequencies, and wherein each of twelve intra-group hopping patterns is identified by boxes containing the same value. Each of a plurality of intra-group hopping patterns may be identified in the hopping matrix by a given value that is the same among random access symbols of the same intra-group hopping pattern, and wherein each intra-group hopping pattern has a different value.

Figure 18:
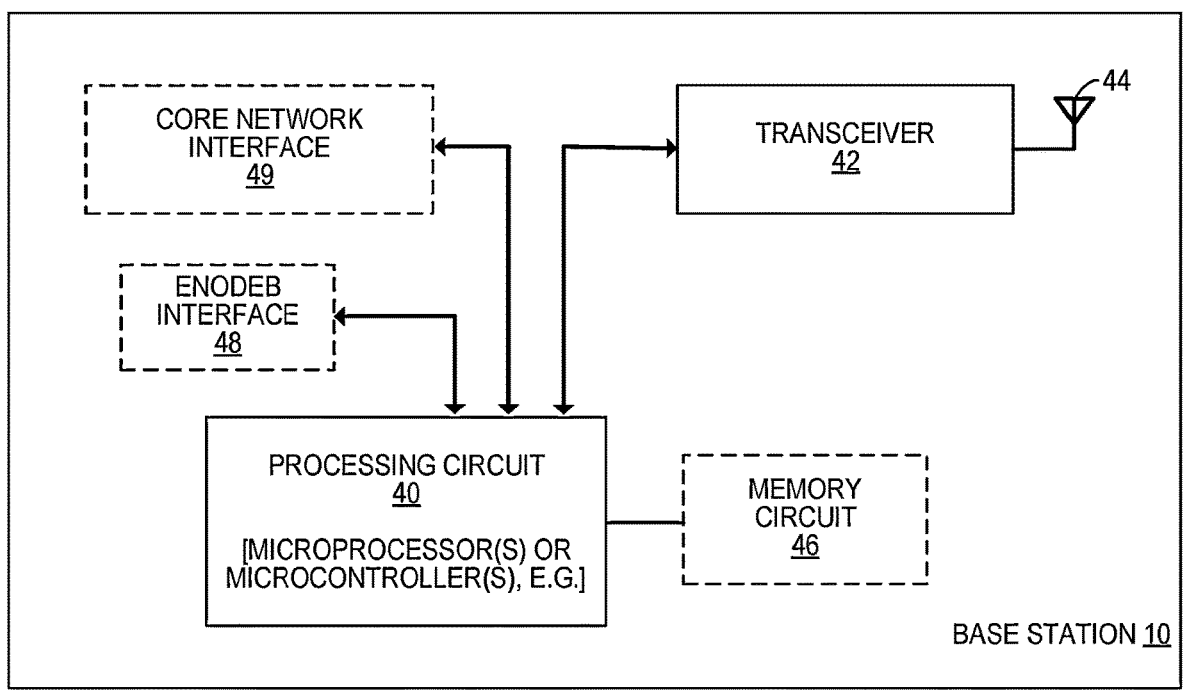
FIG. 18 is a block diagram of a wireless access node configured to carry out one or more of the techniques described herein.

FIG. 18 shows another example radio apparatus, in this case illustrating a wireless access node, such as a base station 10 (e.g., eNB), that is configured to receive a random access preamble signal from the UE 12. The base station 10 comprises a processing circuit 40 that controls the operation of the base station 10. The processing circuit 40, which may include one or more microprocessors, microcontrollers, digital signal processors, specialized digital logic, etc., is connected to a transceiver circuit 42 with associated antenna (s) 44 that are used to transmit signals to, and receive signals from, UEs 12 in the network. The base station 10 also comprises a memory circuit 46 that is connected to the processing circuit 40 and that stores program and other information and data required for the operation of the base station 10. Together, the processing circuit 40 and memory circuit 46 may also be referred to as a processing circuit, and are adapted, in various embodiments, to carry out one or more of the network-based techniques described below.

Base station 10 also includes components and/or circuitry 48 for allowing the base station 10 to exchange information with other base stations 10 (for example, via an X2 interface) and components and/or circuitry 49 for allowing the base station 10 to exchange information with nodes in the core network (for example, via an S1 interface). It will be appreciated that base stations for use in other types of network (e.g., UTRAN or Wideband Code Division Multiple Access or WCDMA RAN) will include similar components to those shown in FIG. 18 and appropriate interface circuitry 48, 49 for enabling communications with the other network nodes in those types of networks (e.g., other base stations, mobility management nodes and/or nodes in the core network).

In some embodiments, the processing circuit 40 of base station 10 is configured to receive a radio frequency signal and detect a random access preamble signal in the received radio frequency signal, where the detected random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1. In other embodiments, the detected random access preamble signal comprises a random access symbol group that comprises a plurality of consecutive symbols, the plurality of consecutive symbols comprising at least three consecutive symbols, where each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

It will be appreciated that the example wireless access node may, more generally, include a radio transceiver adapted to communicate with one or more wireless devices and further comprising one or more processing circuits adapted to carry out the methods for the wireless access node described herein.

According to some embodiments, the base station 10 is adapted to receive a radio frequency signal and detect a random access preamble signal in the received radio frequency signal, where the detected random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

Figure 19:
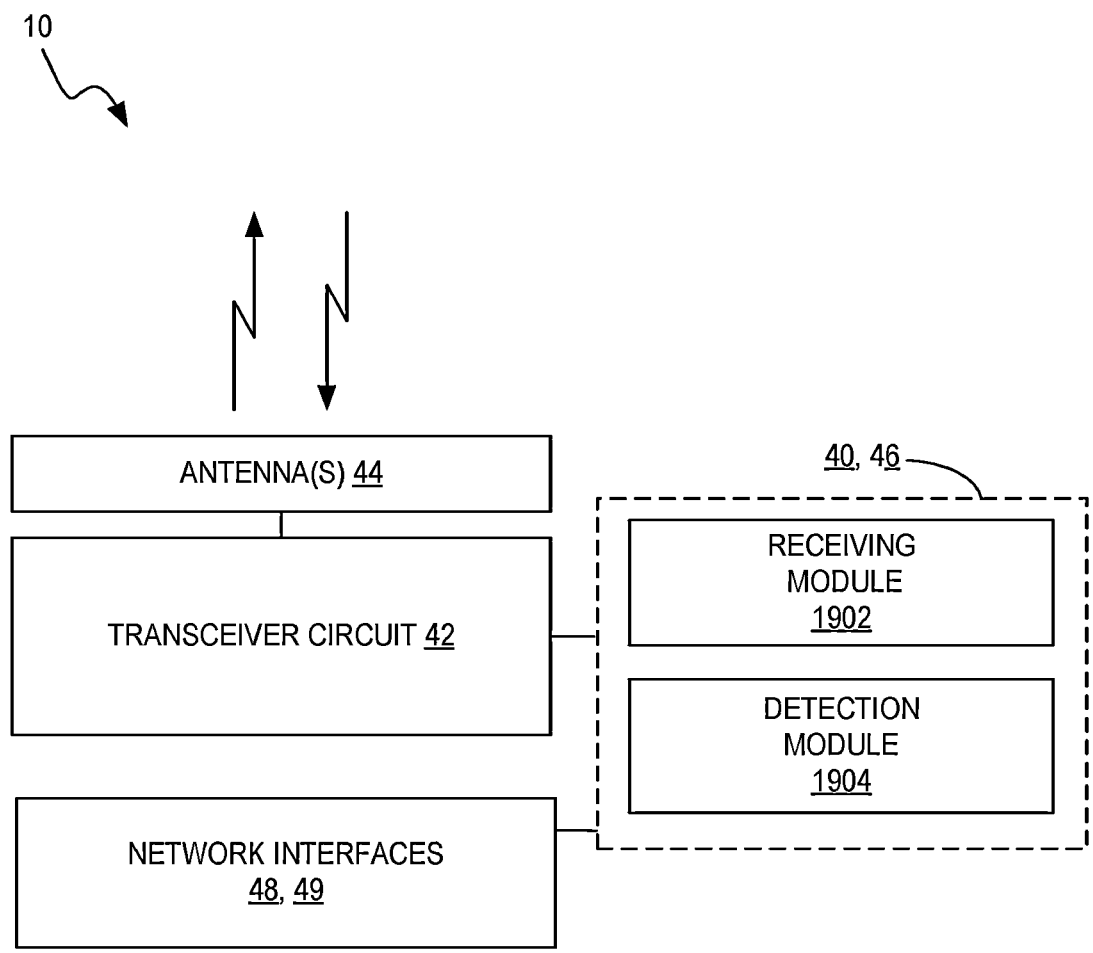
FIG. 19 is a block diagram of a functional implementation of a wireless access node, according to some embodiments.

FIG. 19 illustrates a functional implementation of the wireless access node, including a receiving module 1902 for receiving a radio frequency signal and a detection module 1904 for detecting a random access preamble signal in the received radio frequency signal. The detected random access preamble signal comprises a random access symbol group that comprises a plurality of consecutive symbols, each of the plurality of consecutive symbols being modulated on a corresponding subcarrier frequency and each of the plurality of consecutive symbols corresponding to a truncated sinusoid of 3.75/N kHz, with N>1.

In some embodiments, the receiving module 1902 in FIG. 19 is for receiving a radio frequency signal and the detection module 1904 is for detecting a random access preamble signal in the received radio frequency signal, where the detected random access preamble signal comprises a random access symbol group that comprises a plurality of consecutive symbols, the plurality of consecutive symbols comprising at least three consecutive symbols. Each of the plurality of consecutive symbols is modulated on a corresponding subcarrier frequency and each of the plurality of consecutive symbols of the random access symbol group is modulated on a different subcarrier frequency than all others of the plurality of consecutive symbols of the random access symbol group.

According to some embodiments, a computer program product includes program instructions for a processor in a wireless device operating in a wireless network, where the program instructions are configured so as to cause the wireless device to carry out a method according to any of the wireless device methods (e.g., 1200, 1300) described herein when the program instructions are executed by the processor. According to other embodiments, a computer program product includes program instructions for a processor in a wireless access node operating in a wireless network, where the program instructions are configured so as to cause the wireless access node to carry out a method according to any of the wireless access node methods (e.g., 1600, 1700) described herein when the program instructions are executed by the processor. A non-transitory computer-readable medium may include stored thereupon, the computer program product described here.

Modifications and other variants of the described embodiment(s) will come to mind to one skilled in the art having the benefit of the teachings presented in the foregoing descriptions and the associated figures. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

What is claimed is:

1. A method, in a wireless device operating in a wireless network, the method comprising:
generating a random access preamble signal; and
transmitting the random access preamble signal;
wherein the generated random access preamble signal comprises a random access symbol group that consists of 6/N consecutive symbols, 6/N being an integer greater than or equal to two, each of the consecutive symbols of the random access symbol being modulated on a corresponding subcarrier frequency and each of the consecutive symbols of the random access symbol group corresponding to a truncated sinusoid of 3.75/N KHz, with N>1.

2. The method of claim 1, wherein the consecutive symbols of the random access symbol group are all modulated on a single subcarrier frequency.

3. The method of claim 1, wherein one or more of the consecutive symbols of the random access symbol group are modulated on a first subcarrier frequency and one or more others of the consecutive symbols of the random access symbol group are modulated on a second subcarrier frequency, differing from the first subcarrier frequency.

4. The method of claim 3, wherein each of the consecutive symbols of the random access symbol group is modulated on a different subcarrier frequency than all others of the consecutive symbols of the random access symbol group.

5. The method of claim 4, wherein each of all but a first one of the consecutive symbols of the random access symbol group is modulated on a subcarrier frequency that is offset by a predetermined number of subcarrier spacings from the subcarrier frequency for the preceding one of the consecutive symbols of the random access symbol group.

6. The method of claim 4, wherein a mapping of the consecutive symbols of the random access symbol group to subcarrier frequencies is determined by a hopping matrix, wherein said hopping matrix defines multiple mapping patterns that each depend on a subcarrier frequency for a first one of the consecutive symbols of the random access symbol group.

7. The method of claim 6, wherein the hopping matrix is defined such that any random access symbol group defined by the hopping matrix is adjacent to any other random access symbol group defined by the hopping matrix for no more than one symbol time.

8. The method of claim 6, wherein the hopping matrix comprises a horizontal axis that corresponds to symbols and a vertical axis that corresponds to subcarrier frequencies, wherein each of a plurality of intra-group hopping patterns is identified in the hopping matrix by a given value that is the same among random access symbols of the same intra-group hopping pattern, and wherein each intra-group hopping pattern has a different value.

9. The method of claim 1, wherein the method further comprises receiving, from the wireless network, an indication of N.

10. The method of claim 1, wherein the generated random access preamble signal further comprises one or more repetitions of the random access symbol group.

11. A wireless device comprising:
a radio transceiver configured to communicate with a wireless network; and
one or more processing circuits operatively coupled to the radio transceiver and configured to:
generate a random access preamble signal; and
transmit the random access preamble signal, via the radio transceiver;
wherein the generated random access preamble signal comprises a random access symbol group that consists of 6/N consecutive symbols, 6/N being an integer greater than or equal to two, each of the consecutive symbols of the random access symbol being modulated on a corresponding subcarrier frequency and each of the consecutive symbols of the random access symbol group corresponding to a truncated sinusoid of 3.75/N kHz, with N>1.

12. A method, in a wireless access node operating in a wireless network, the method comprising:
receiving a radio frequency signal; and
detecting a random access preamble signal in the received radio frequency signal;
wherein the detected random access preamble signal comprises a random access symbol group that comprises a random access symbol group that consists of 6/N consecutive symbols, 6/N being an integer greater than or equal to two, each of the consecutive symbols of the random access symbol being modulated on a corresponding subcarrier frequency and each of the consecutive symbols of the random access symbol group corresponding to a truncated sinusoid of 3.75/N kHz, with N>1.

13. The method of claim 12, wherein the consecutive symbols of the random access symbol group are all modulated on a single subcarrier frequency.

14. The method of claim 12, wherein one or more of the consecutive symbols of the random access symbol group are modulated on a first subcarrier frequency and one or more others of the consecutive symbols of the random access symbol group are modulated on a second subcarrier frequency, differing from the first subcarrier frequency.

15. The method of claim 14, wherein each of the consecutive symbols of the random access symbol group is modulated on a different subcarrier frequency than all others of the consecutive symbols of the random access symbol group.

16. The method of claim 12, wherein a mapping of the consecutive symbols of the random access symbol group to subcarrier frequencies is determined by a hopping matrix, wherein said hopping matrix defines multiple mapping patterns that each depend on a subcarrier frequency for a first one of the consecutive symbols of the random access symbol group.

17. The method of claim 16, wherein the hopping matrix is defined such that any random access symbol group defined by the hopping matrix is adjacent to any other random access symbol group defined by the hopping matrix for no more than one symbol time.

18. A wireless access node comprising:
a radio transceiver configured to communicate with one or more wireless devices; and
one or more processing circuits operatively coupled to the radio transceiver and configured to:
receive a radio frequency signal; and detect a random access preamble signal in the received radio frequency signal;

wherein the detected random access preamble signal comprises a random access symbol group that consists of 6/N consecutive symbols, 6/N being an integer greater than or equal to two, each of the consecutive symbols of the random access symbol being modulated on a corresponding subcarrier frequency and each of the consecutive symbols of the random access symbol group corresponding to a truncated sinusoid of 3.75/N kHz, with N>1.

\* \* \* \* \*

UNITED STATES PATENT AND TRADEMARK OFFICE
CERTIFICATE OF CORRECTION

PATENT NO. : 11,778,656 B2
APPLICATION NO. : 17/948673
DATED : October 3, 2023
INVENTOR(S) : Lin et al.

It is certified that error appears in the above-identified patent and that said Letters Patent is hereby corrected as shown below:

On the Title Page

Item (72), under "Inventors", in Column 1, Line 1, delete "San Clara," and insert -- Santa Clara, --, therefor.

Item (56), under "OTHER PUBLICATIONS", in Column 2, Line 1, delete "Xingqin ," and insert -- Xingqin, --, therefor.

On Page 2, item (56), under "OTHER PUBLICATIONS", in Column 2, Line 1, delete "Author ," and insert -- Author, --, therefor.

On Page 2, item (56), under "OTHER PUBLICATIONS", in Column 2, Line 2, delete "Network" and insert -- Network; --, therefor.

On Page 2, item (56), under "OTHER PUBLICATIONS", in Column 2, Line 5, delete "Author ," and insert -- Author, --, therefor.

On Page 2, item (56), under "OTHER PUBLICATIONS", in Column 2, Line 8, delete "Author ," and insert -- Author, --, therefor.

On Page 2, item (56), under "OTHER PUBLICATIONS", in Column 2, Line 11, delete "Author ," and insert -- Author, --, therefor.

On Page 2, item (56), under "OTHER PUBLICATIONS", in Column 2, Line 11, delete ""NB-IoT-NPRACH" and insert -- "NB-IoT—NPRACH --, therefor.

On Page 2, item (56), under "OTHER PUBLICATIONS", in Column 2, Line 14, delete "Author ," and insert -- Author, --, therefor.

Signed and Sealed this
Twenty-sixth Day of March, 2024

*Katherine Kelly Vidal*

Katherine Kelly Vidal
*Director of the United States Patent and Trademark Office*

On Page 2, item (56), under "OTHER PUBLICATIONS", in Column 2, Line 17, delete "Author ," and insert -- Author, --, therefor.

On Page 2, item (56), under "OTHER PUBLICATIONS", in Column 2, Line 17, delete ""NB-IoT-UL" and insert -- "NB-IoT—UL --, therefor.

On Page 2, item (56), under "OTHER PUBLICATIONS", in Column 2, Line 19, delete "Author ," and insert -- Author, --, therefor.

In the Specification

In Column 1, Line 26, delete "NB-Iot" and insert -- NB-IoT --, therefor.

In Column 2, Line 36, delete "Identification" and insert -- Identifier --, therefor.

In Column 2, Line 42, delete "code" and insert -- check --, therefor.

In Column 3, Line 48, delete "8192 Ts=266.7" and insert -- 8192Ts=266.7 --, therefor.

In Column 6, Line 14, delete "describe" and insert -- described --, therefor.

In Column 7, Line 48, delete "equipped" and insert -- equipment --, therefor.

In Column 7, Lines 66-67, delete "periodicity" and insert -- periodicity of --, therefor.

In Column 8, Line 9, delete "distance" and insert -- distance of --, therefor.

In Column 9, Line 11, delete "RadioResouce" and insert -- RadioResource --, therefor.

In Column 10, Line 50, delete "3.6/N" and insert -- 3. 6/N --, therefor.

In Column 12, Line 32, delete "to a" and insert -- to as a --, therefor.

In Column 13, Line 59, delete "3.6/N" and insert -- 3. 6/N --, therefor.

In the Claims

In Column 17, Line 25, in Claim 1, delete "KHz," and insert -- kHz, --, therefor.

In Column 18, Lines 27-28, in Claim 12, delete "that comprises a random access symbol group that consists" and insert -- that consists --, therefor.